United States Patent
Schwab et al.

(10) Patent No.: US 6,830,381 B2
(45) Date of Patent: Dec. 14, 2004

(54) AXIAL ROLLER BEARING

(75) Inventors: Charles M. Schwab, Fort Mill, SC (US); J. Kevin Brown, Fort Mill, SC (US)

(73) Assignee: INA-Schaeffler KG, Herzogenaurach (DE)

( * ) Notice: Subject to any disclaimer, the term of this patent is extended or adjusted under 35 U.S.C. 154(b) by 55 days.

(21) Appl. No.: 10/187,531

(22) Filed: Jul. 2, 2002

(65) Prior Publication Data

US 2003/0190106 A1 Oct. 9, 2003

Related U.S. Application Data

(60) Provisional application No. 60/369,705, filed on Apr. 3, 2002.

(51) Int. Cl.[7] ............................................. F16C 23/00
(52) U.S. Cl. ..................................................... 384/620
(58) Field of Search ................................. 384/618, 620, 384/621, 622

(56) References Cited

U.S. PATENT DOCUMENTS

| | | | | |
|---|---|---|---|---|
| 3,999,816 A | * | 12/1976 | Pitner | 384/620 |
| 4,042,285 A | * | 8/1977 | Dorsch | 384/621 |
| 4,168,869 A | * | 9/1979 | Stephan | 384/455 |
| 4,725,153 A | * | 2/1988 | Tsuruki | 384/620 |
| 4,910,847 A | * | 3/1990 | Christenson et al. | 29/898.041 |
| 5,293,688 A | * | 3/1994 | Koch et al. | 29/898.041 |
| 5,630,670 A | * | 5/1997 | Griffin et al. | 384/606 |
| 5,647,675 A | * | 7/1997 | Metten et al. | 384/620 |
| 5,879,086 A | * | 3/1999 | Muntnich et al. | 384/621 |
| 5,967,674 A | * | 10/1999 | Reubelt et al. | 384/620 |
| 6,102,580 A | * | 8/2000 | Alling et al. | 384/618 |

* cited by examiner

Primary Examiner—William C. Joyce
Assistant Examiner—Julie K. Smith
(74) Attorney, Agent, or Firm—Volpe and Koenig, P.C.

(57) ABSTRACT

An axial bearing unit made up of a cage (2) and races (3, 4) is in which the collar (5) located at the outer peripheral edge of the race (3) is extended by a first flange (7) and a protruding rib (8) is formed in an area made up of the collar (5) and the flange (7). The protruding rib faces inwardly to radically contain the cage (2).

11 Claims, 1 Drawing Sheet ns at a distance from one another, thus allowing the lubricant to flow through without considerable flow resistance, in the second case the oil retention capability of the bearing is increased by the continuous edge.

AXIAL ROLLER BEARING

Translation of U.S. Provisional Appln. No. 60/369,705

AREA OF APPLICATION OF THE INVENTION

This invention relates to an axial bearing with a cage containing rolling elements in pockets, said cage located between two planar parallel races that are in particular made of sheet metal, wherein these three components are held together as a unit by opposing form-locked containment, and wherein both races transition into collars that surround the cage, with play, at an outer or inner peripheral edge.

BACKGROUND OF THE INVENTION

A prior art axial roller bearing of this type is known from U.S. Pat. No. 2,891,828. It comprises two races that extend in planes parallel to one another, each of which transitions into an axial collar at the outer or inner peripheral edge. Bearing needles held in a cage roll between the two races on associated raceways. The two collars, which are axially opposed to one another, surround the cage, with play, and have a number of retaining projections at their ends that are evenly distributed along the perimeter. These retaining projections, which are directed either radially inwardly or radially outwardly, contain the cage, thus forming a lasting axial bearing unit that consists of two races and a cage. The oil flow occurs from the inside outward as a result of the rotating axial bearing.

There are areas of application in gear designs in which the oil stream is to be redirected in a definite direction after leaving the bearing. However, this is not possible using the prior art bearings in this class.

SUMMARY OF THE INVENTION

It is thus the object of this invention to further develop a bearing in this class such that the flow of lubricant is made to be as unhindered and as directed as possible.

According to the invention, this object is met in that the collar located at the outer peripheral edge of the race is lengthened using a flange, and that a radially inwardly protruding dimple is formed in an area made up of the collar and the flange, and this protruding dimple axially contains the cage.

The flange that attaches to the collar acts as a guide panel for the lubricant stream and provides for its directed exit from the bearing. The radially inwardly facing protruding dimple in turn holds the bearing unit, which includes these three components, securely together.

Advantageous developments of the invention are described in dependent claims 2 through 11.

Thus, claims 2 and 3 provide that the protruding dimple is located either in the transition area of collar and flange in a radial plane containing the associated second race or in the area of the flange.

In the first case, the first race is securely supported off of the other race, whereas in the second case an expansion of the axial bearing is made possible in case a shaft supported by it lifts up.

According to other additional features in claims 4 and 5 the protruding dimple is formed of either a number of retaining projections evenly distributed along the perimeter or is to be designed as a continuous edge.

Whereas in the first case, the open annular gap between the two races is enlarged as a result of the retaining projec- According to another feature in claim 6, the protruding dimple is formed by stamping, which is a technologically very easy means of manufacture.

According to another feature in claim 7, the race is also to be continued at its inner peripheral edge by means of a flange. This second flange acts in principle similar to the first, i.e. it enables a directed influx of the lubricant into the bearing unit.

Claim 8 states that the axial dimension of the flange should correspond approximately to the dimension of the entire bearing unit. However, these size ratios can vary depending on the individual installation and can assume different values.

In a further aspect of the invention, the axial bearing unit is further held together by providing the collar located at the inner peripheral edge of the race with a protruding dimple that is directed radially outward and that axially contains the cage.

According to another feature in claim 10, the collar located at the inner peripheral edge is provided with curved recesses evenly distributed along the perimeter. This design makes the influx of the lubricant into the bearing easier since an enlarged gap between the collar of the first race and the other race is created in this way.

Finally, according to another aspect of the invention, the cage is to be profiled as seen in the longitudinal direction and has a bead at each of its inner and outer peripheral surfaces, by which the cage is held in the axial radial direction at the collars of the races.

The invention is explained in more detail in the following exemplary embodiment.

BRIEF DESCRIPTION OF THE DRAWINGS

Shown are.

DETAILED DESCRIPTION OF THE DRAWINGS

Figure 1:
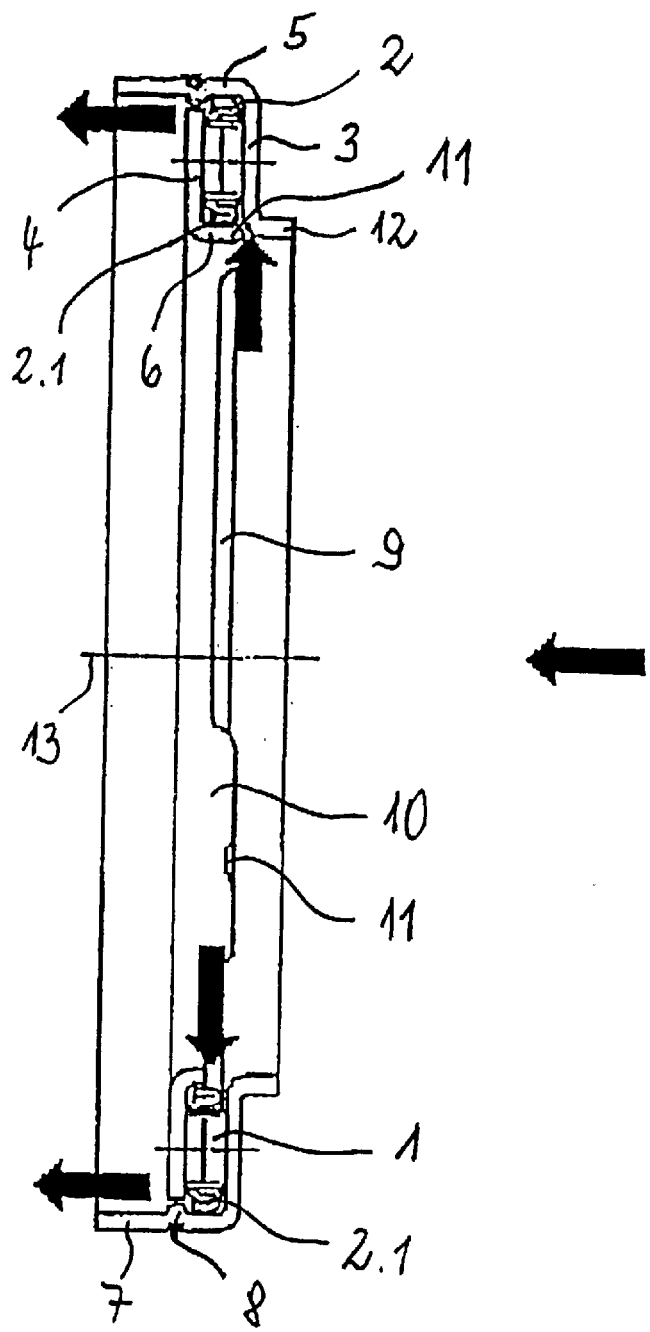
FIG. 1 is a longitudinal section through an axial bearing according to the invention and FIG. 2 is an enlarged representation of a detail in FIG. 1.
Figure 2:
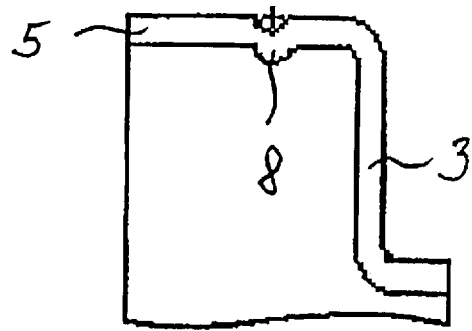

The axial roller bearing according to FIG. 1 comprises the bearing cage 2 containing rollers 1, which is provided with a bead 2.1 on each of its inner and outer peripheral surfaces and which is located between two planar parallel races 3, 4. Race 3 has an axial collar 5 at its outer peripheral edge, whereas race 4 has an axial collar 6 at its inner peripheral edge. These two collars 5, 6 face opposite one another and are aligned in the axial direction. The collar 5 of the race 3 is extended by a first flange 7 that has an axial dimension that is approximately equal to that of the races 3, 4 and the rollers 1. In the transition zone between the collar 5 and the first flange 7, the race 3 is provided with a projecting dimple or rib 8 that is directed radially inwardly and that contains the cage 2 axially. In the preferred embodiment, this projecting rib 8 is located in the same radial plane as race 4, so that race 3 can be supported off of race 4. The projecting rib 8 can, however, also be shifted outward to the left. This would provide the advantage in that the axial bearing can expand in the axial direction. The projecting rib 8 is formed of either a number of retaining bosses evenly distributed along the perimeter or is designed a continuous rib that extends over 360°. In the first case, the lubricant flow resistance in the bearing is lowered since the radial gap between the races 3, 4 near the radial plane of race 4 is only decreased by the projecting rib 8 in the form of evenly distributed retaining bosses. In the second case, the projecting rib 8 in the form of a continuous edge acts as a type of seal since the radial gap between the races 3 and 4 near the radial plane is taken up by race 4. The projecting rib 8 can, as shown particularly by the enlarged representation in FIG. 2, be made in a simple manner without machining using a stamping process.

The collar 6 of the race 4 is provided with curved recesses 9 evenly distributed along the perimeter so that, as seen in the lower section of FIG. 1, a relatively wide gap is formed between the two races 3, 4 into which the lubricant can penetrate unhindered. In the area 10 between the curved recesses 9, the collar 6 of race 4 is provided with a protrusion 11 that is directed radially outward, and that radially contains cage 2 so that the entire bearing arrangement is prevented from falling apart.

As indicated in FIG. 1 by the arrows, the lubricant initially flows parallel to the bearing axis 13 into the bearing area, with the second flange 12 of race 3 acting as a guide panel. After turning radially, the lubricant enters the inner bearing area, made possible by the gap between collar 6 and race 3, as shown in the lower half of the picture in FIG. 1. After penetrating the interior bearing cavity, the lubricant leaves it in the upper area, with the first flange 7 again having a guiding function, i.e. the lubricant leaves the bearing in a defined, desired direction.

Reference Numbers

1 Roller
2 Bearing Cage
2.1 Bead
3 Race
4 Race
5 Collar
6 Collar
7 Flange
8 Rib
9 Curved Recess
10 Area
11 Protrusion
12 Flange
13 Bearing Axis

What is claimed is:

1. An axial bearing with a cage containing rollers in pockets, said cage located between first and second planar parallel races formed from sheet metal, the cage and are held together as a unit by means of opposing form-locked containment, and wherein an outer peripheral edge of the first race and an inner peripheral edge of the second race each transition into a collar that surrounds the cage with play, a radially inwardly facing protruding rib is formed at an end of the collar located at the outer peripheral edge of the first race, and an axially extending flange for directing lubricant flow out of the bearing extends beyond the protruding rib, so that the radially inwardly facing protruding rib is formed in a tradition area between the collar and the flange, and the protruding rib axially contains the cage.

2. An axial bearing according to claim 1, wherein the protruding rib is located in the transition area of collar and flange in a radial plane containing the associated second race.

3. An axial bearing according to claim 1, wherein the protruding rib is located in the area of the flange.

4. An axial bearing according to claim 1, wherein the protruding rib is comprised of a number of retaining bosses evenly distributed along the perimeter.

5. An axial bearing according to claim 1, wherein the protruding rib is continuous.

6. An axial bearing according to claim 1, wherein the protruding rib is formed by stamping.

7. An arial bearing according to claim 1, wherein the second race is continued at an inner peripheral edge by a flange.

8. An axial bearing according to claim 1, wherein an axial dimension of the flange corresponds approximately to an axial dimension of the bearing unit.

9. An axial bearing according to claim 1, wherein the collar located at the inner peripheral edge of the second race is provided with a protruding rib that is directed radially outward and that axially contains the cage.

10. An axial bearing according to claim 1, characterized in that the collar located at the inner peripheral edge is provided with curved recesses evenly distributed along the perimeter.

11. An anal bearing according to claim 1, wherein the cage is profiled in a longitudinal direction and has a bead at each of inner and outer peripheral surfaces thereof, to hold the cage in an axial direction at the collars of the races.

* * * * *